(12) United States Patent
Kwa et al.

(10) Patent No.: US 8,332,675 B2
(45) Date of Patent: Dec. 11, 2012

(54) LATENCY BASED PLATFORM COORDINATION

(75) Inventors: Seh W. Kwa, San Jose, CA (US);
Robert Gough, Cornelius, OR (US);
Neil Songer, Santa Clara, CA (US);
Jaya L. Jeyaseelan, Cupertino, CA (US); Barnes Cooper, Tigard, OR (US);
Nilesh V. Shah, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 13/213,353

(22) Filed: Aug. 19, 2011

(65) Prior Publication Data

US 2011/0302626 A1 Dec. 8, 2011

Related U.S. Application Data

(63) Continuation of application No. 12/006,251, filed on Dec. 31, 2007, now abandoned.

(51) Int. Cl.
*G06F 1/32* (2006.01)
*G06F 1/00* (2006.01)
*G06F 13/36* (2006.01)

(52) U.S. Cl. ......... 713/320; 713/323; 710/306; 710/311

(58) Field of Classification Search ............... 713/320, 713/324, 322, 323; 710/306, 311
See application file for complete search history.

(56) References Cited

U.S. PATENT DOCUMENTS 5,838,603 A 11/1998 Mori et al.
6,155,160 A * 12/2000 Hochbrueckner ............... 99/331
7,716,506 B1 * 5/2010 Surgutchik et al. ........... 713/321
2004/0128576 A1 * 7/2004 Gutman et al. ................ 713/323
2005/0273633 A1 * 12/2005 Wilcox et al. ................. 713/300
2009/0172434 A1 * 7/2009 Kwa et al. ..................... 713/320

OTHER PUBLICATIONS

"Latency Tolerance Reporting", PCI-SIG Engineering Change Notice, published Jan. 22, 2008, updated Aug. 14, 2008, 1-11 pages.
"Latency Tolerance Requirement Reporting", PCI-SIG Draft Engineering Change Request, Jan. 22, 2008, updated May 16, 2008, 1-13 pages.
"Latency Tolerance Requirement Reporting", PIC-SIG Draft Engineering Change Request, Jan. 22, 2008, updated Jun. 18, 2008, 1-13 pages.
"Latency Tolerance Requirement Reporting", PCI-SIG Draft Engineering Change Request, Jan. 22, 2008, updated Jun. 19 2008, 1-13 pages.
"Latency Tolerance Requirement Reporting", PCI-SIG Draft Engineering Change Request, Jan. 22, 2008, updated Aug. 9, 2008, 1-11 pages.
"Latency Tolerance Requirement Reporting", PCI-SIG Draft Engineering Change Request, Jan. 22 2008, updated Aug. 14, 2008, 1-11 pages.
Jeyaseelan, "Energy Efficient Platforms—New Power Management Extension", Intel Developer Forum, 2008, 1-9 pages.
Balchandani et al., "Interconnect Bus Extensions for Energy-Efficient Platforms", Intel Developer Forum, 2010, 1-30 pages.

(Continued)

*Primary Examiner* — Thomas J Cleary
(74) *Attorney, Agent, or Firm* — Caven & Aghevli LLC (57) ABSTRACT

In some embodiments, an electronic apparatus comprises at least one processor, a plurality of components, and a policy engine comprising logic to receive latency data from one or more components in the electronic device, compute a minimum latency tolerance value from the latency data, and determine a power management policy from the minimum latency tolerance value.

15 Claims, 4 Drawing Sheets

OTHER PUBLICATIONS

Jeyaseelan et al., "Device Guidelines for PCI Express Technology Extensions", Intel Developer Forum 2010, 1-31 pages.
"Energy-Efficient Platforms—Designing Devices Using the New Power Management Extensions for Interconnects", Revision 1.0, Intel White Paper, Jul. 2009, 1-38 pages.
"Latency Tolerance Reporting", PCI-SIG Draft Engineering Change Request, Jan. 22, 2008, 1-6 pages.
"Latency Tolerance Reporting", PCI-SIG Draft Engineering Change Request, Jan. 22, 2008, updated Feb. 5, 2008, 1-6 pages.
"PCI Express Base Specification", Revision 2.0, PCI-SIG, Dec. 20, 2006, pp. 1-608.
"PCI Express Base Specification", Revision 2.1, PIC-SIG, Mar. 4, 2009. pp. 1-704.
"Intel 82580 Gigabit Ethernet Controller", Intel Product Brief, 2009, pp. 1-5.
"Designing Power-Friendly Devices", Intel White Paper, 2007, pp. 1-18.
"PCI-SIG ECN Development Scope of Authorization", PCI-SIG pp. 1-2.
"Rough draft for the optional Latency Tolerance Reporting (LTR) mechanism", updated Jan. 17, 2008, 1-5 pages.
Office Action Received for U.S Appl. No. 12/960,277, mailed on Feb. 16, 2011, 27 pages.
Office Action Received for U.S. Appl. No. 12/006,251, mailed on May 2, 2011, 29 pages.
Office Action Received for U.S. Appl. No. 12/006,251, mailed on Sep. 29, 2010, 24 pages.
"PCI-SIG, PCIE Enhancements for Platform PM Improvement—Latency Tolerance Reporting", Dec. 12, 2007.
"Latency Tolerance Reporting", Jan. 22, 2007.
"PCIe Enhancements for Platform PM Improvement—Optimized Buffer Flush/Fill", Dec. 12, 2007.
"Latency Tolerance Reporting", PCI-SIG Draft Engineering Change Request, Jan. 22, 2008, updated Feb. 6, 2008.
"Latency Tolerance Reporting", PCI-SIG Draft Engineering Change Request, Jan. 22, 2008, updated Feb. 8, 2008.
"Latency Tolerance & B/W Requirement Reporting", PCI-SIG Draft Engineering Change Request, Jan. 22, 2008, updated Feb. 19, 2008.
"Opportunistic Buffer Flush/Fill", PCI-SIG Draft Engineering Change Request, Feb. 8, 2008, updated Feb. 19, 2008.
"PCI Express* (PCIe*) Accelerator Features", Intel White Paper, 2008.

* cited by examiner

LATENCY BASED PLATFORM COORDINATION

RELATED APPLICATIONS

This application is a continuation of and claims priority to U.S. patent application Ser. No. 12/006,251 titled, "LATENCY BASED PLATFORM COORDINATION", which was filed on Dec. 31, 2007; this application is entirely incorporated by reference.

BACKGROUND

Power management of the interconnected devices is becoming more of a concern as computers implement mobile system platforms where the computers and devices are battery powered. One of the biggest challenges of implementing an aggressive platform power management for mobile PC client and handheld devices is the lack of awareness of device latency tolerance to main memory accesses (DMA) and application latency dependency to facilitate power policy decisions. Deeper sleep states gain greater power savings, but at the cost of longer resume time. For example, deeper sleep states helps microprocessors achieve very low power, but require up to 200 microseconds to resume versus keeping the processor in a "lighter" (shallower) sleep state. Platform phase-locked loop (PLL) shutdown requires 20-50 microseconds to resume, versus 10's of nanoseconds with clock gating.

Due to the lack of awareness in device latency tolerance, some computing platforms maintain system resources in an available state (especially data paths and system memory) even during idle states. Maintaining these resources in an available state consumes power.

BRIEF DESCRIPTION OF THE DRAWINGS

The detailed description is described with reference to the accompanying figures, in which.

DETAILED DESCRIPTION

Described herein are exemplary systems and methods for implementing latency based platform coordination which, in some embodiments, may be implemented in an electronic device such as, e.g., a computer system. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Figure 1A:
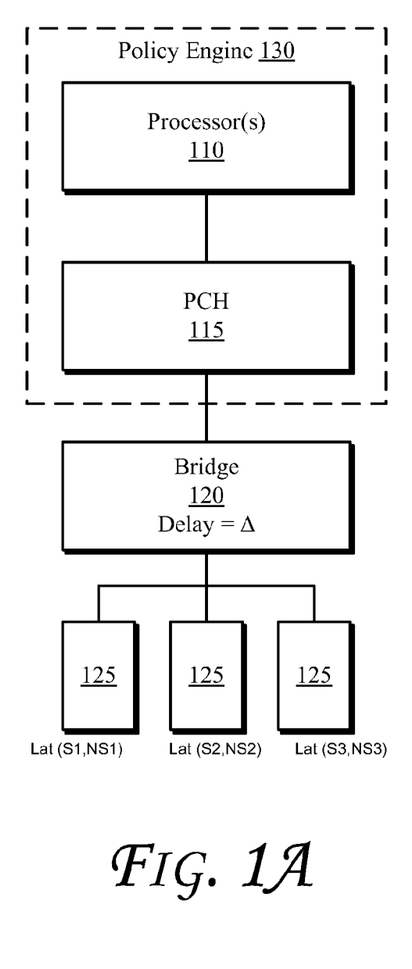
FIGS. 1A-1C are schematic block diagrams of portions of an apparatus that supports latency based platform coordination, according to some embodiments.
Figure 1B:
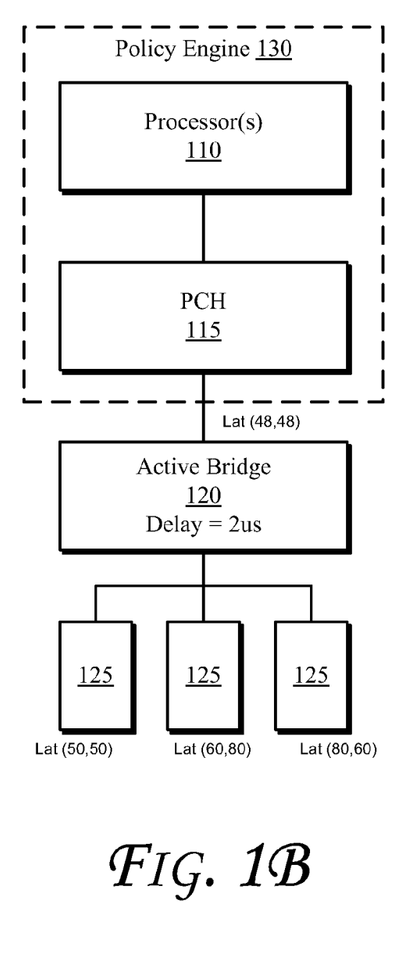
Figure 1C:
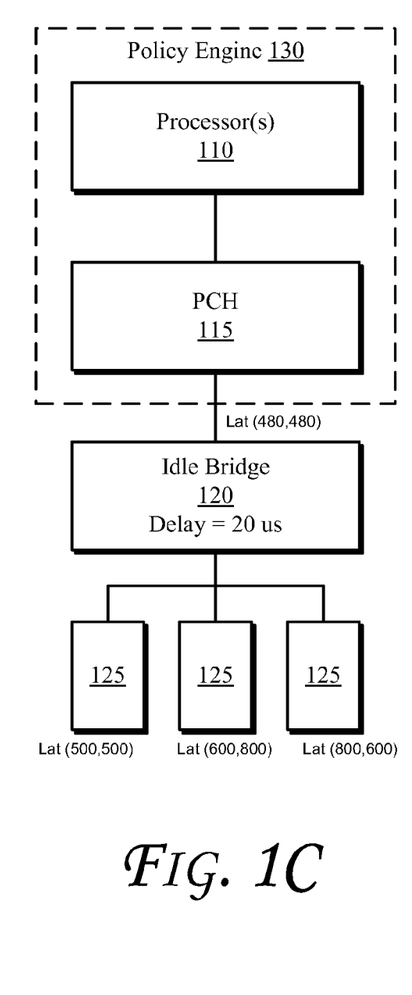
Figure 2:
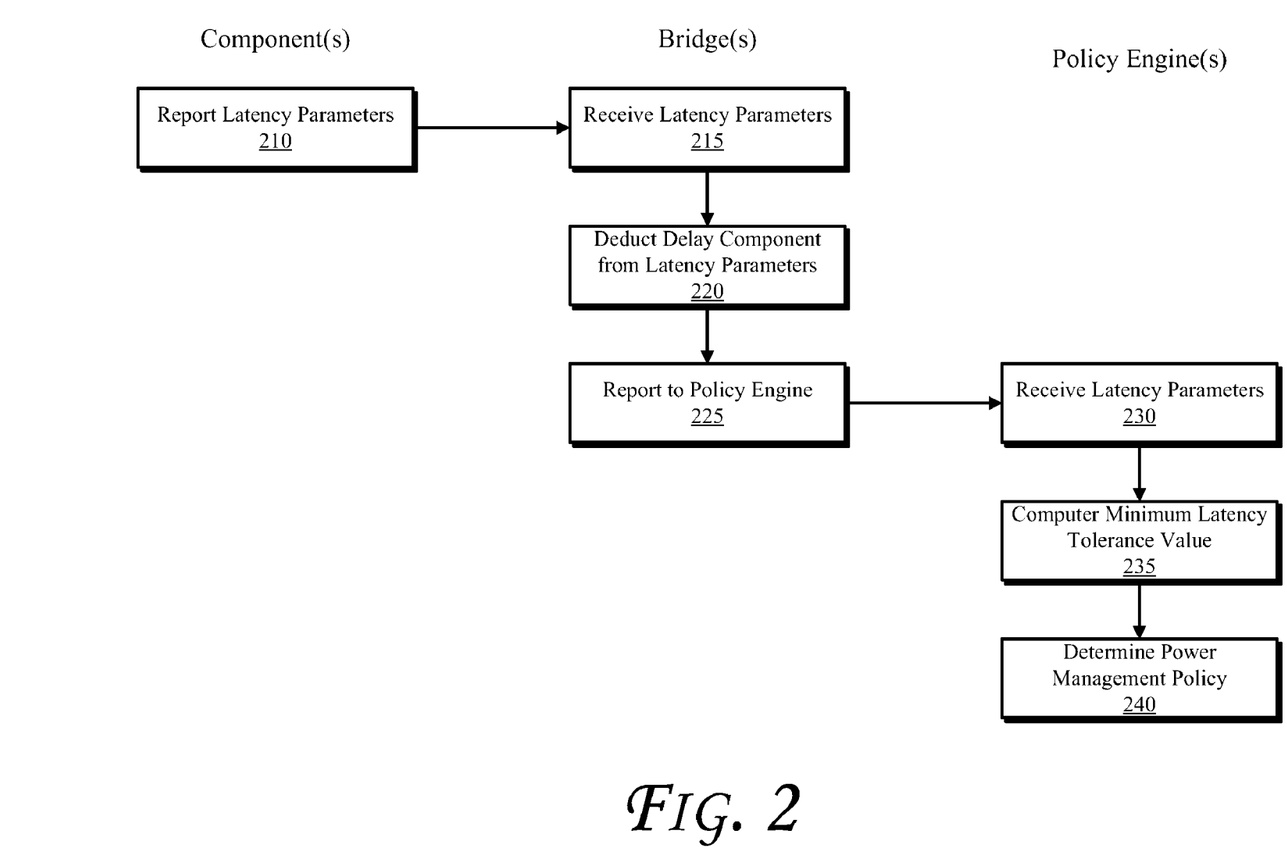
FIG. 2 is a flowchart illustrating operations in a method to implement latency based platform coordination, according to some embodiments.

Embodiments of systems which implement latency based platform coordination will be explained with reference to FIGS. 1A-1C and FIG. 2. FIGS. 1A-1C are schematic block diagrams of portions of an apparatus that supports latency based platform coordination, according to some embodiments. FIG. 2 is a flowchart illustrating operations in a method to implement latency based platform coordination, according to some embodiments.

Referring first to FIG. 1A, a system to implement latency based platform coordination comprises one or more processors 110 and a platform control hub (PCH) 115, which in combination are sometimes referred to as the root complex. A policy engine 130 is implemented in the system as an abstract device which comprises logic to implement latency based platform coordination. In some embodiments, the policy engine 130 may be implemented as logic instructions stored on a computer readable medium which, when executed by a processor configure the processor to implement latency based platform coordination operations. In some embodiments, the policy engine 130 may be reduced to logic, for example in a programmable logic device such as a field programmable gate array (FPGA) or may be reduced to hardwired circuit logic. The policy engine 130 may be implemented as a single, discrete entity, or may be distributed between multiple processing components in the root complex.

The system further comprises a plurality of components 125 coupled to the policy engine 130 by a bridge/switching device 120. In some embodiments, each of the plurality of components reports (operation 210) its snoop latency, alone or in combination with its non-snoop latency to the policy engine to the policy engine 130. In the embodiment depicted in FIG. 1, the latency parameters may be reported as a tuple, in which the snoop latency parameter is represented by the symbol Sn, where an identifies the component, and in which the non-snoop latency is represented by the symbol NSn, where an identifies the component. Thus, Lat(S1, NS1) represents the snoop and non-snoop latency parameters for the first component. Similarly, Lat(S2, NS2) represents the snoop and non-snoop latency parameters for the second component and Lat(S3, NS3) represents the snoop and non-snoop latency parameters for the third component. In practice, the system may comprise dozens or even hundreds of components.

In the embodiment depicted in FIG. 1A, each of the components 125 reports its latency parameters through the bridge/switching device 120, which receives the parameters at operation 215. In other embodiments, one or more of the components 125 may be coupled directly to one of the processors 110 in the policy engine 130, such that the device could report its latency parameter directly to the policy engine 130. In some embodiments, the bridge/switching device 120 has a characteristic delay indicated in the drawings by the symbol Δ. The delay, Δ, associated with the bridge/switching device 120 may be variable as a function of the switching/transmission capacity associated with the bridge/switching device 120, the traffic flowing through the bridge/switching device 120, and the power state of the bridge/switching device 120. For example, a bridge/switching device that is an inactive/idle state or sleep state would have a higher characteristic delay than a bridge/switching device 120 that is an active state. Similarly, a bridge/switching device 120 with a high traffic load would have a higher characteristic delay than a bridge/switching device 120 with a low traffic load.

In some embodiments, the bridge/switching device 120 comprises logic to selectively report latency parameters from the components 125 coupled to the bridge/switching device 120. In addition, in some embodiments the bridge/switching device 120 comprises logic to modify the reported latency parameters in order to compensate for the delay, Δ, associated with the bridge/switching device 120. In one embodiment, the bridge/switching device implements logic to deduct the characteristic delay, Δ, associated with the bridge/switching device 120 from each of the latency parameters for each of the components coupled to the bridge/switching device 120, at operation 220. The bridge/switching device 120 may further implement logic to report the latency parameters to the policy engine 130, at operation 225. For example, the bridge/switching device 120 may report to the policy engine the MIN(Lat (S1-Δ, NS1-Δ), Lat(S2-Δ, NS2-Δ), Lat(S3-Δ, NS3-Δ)).

The policy engine 130 receives the reported latency parameters from the bridge/switching device 120 at operation 130. In some embodiments, the policy engine 130 implements logic to compute a minimum latency tolerance value (operation 235) from the latency parameters reported into the policy engine 130. The policy engine 130 then uses a minimum latency tolerance value to determine a power management policy for the system.

FIG. 1B is a schematic illustration of an example in which the system is in an active mode. Each of the components 125 reports their respective latency values into the bridge/switching device 120. In an active state, the bridge/switching device 120 has a characteristic delay of 2 μs. As described above, the bridge/switching device receives the latency parameters from the respective components 125 and deducts the characteristic delay of 2 μs from the reported parameters. The bridge/switching device 120 then reports the minimum latency parameter tuple to the policy engine 130.

FIG. 1C is a schematic illustration of an example in which the system is in an active mode. Each of the components 125 reports their respective latency values into the bridge/switching device 120. In an active state, the bridge/switching device 120 has a characteristic delay of 20 μs. As described above, the bridge/switching device receives the latency parameters from the respective components 125 and deducts the characteristic delay of 2 o μs from the reported parameters. The bridge/switching device 120 then reports the minimum latency parameter tuple to the policy engine 130.

Figure 3:
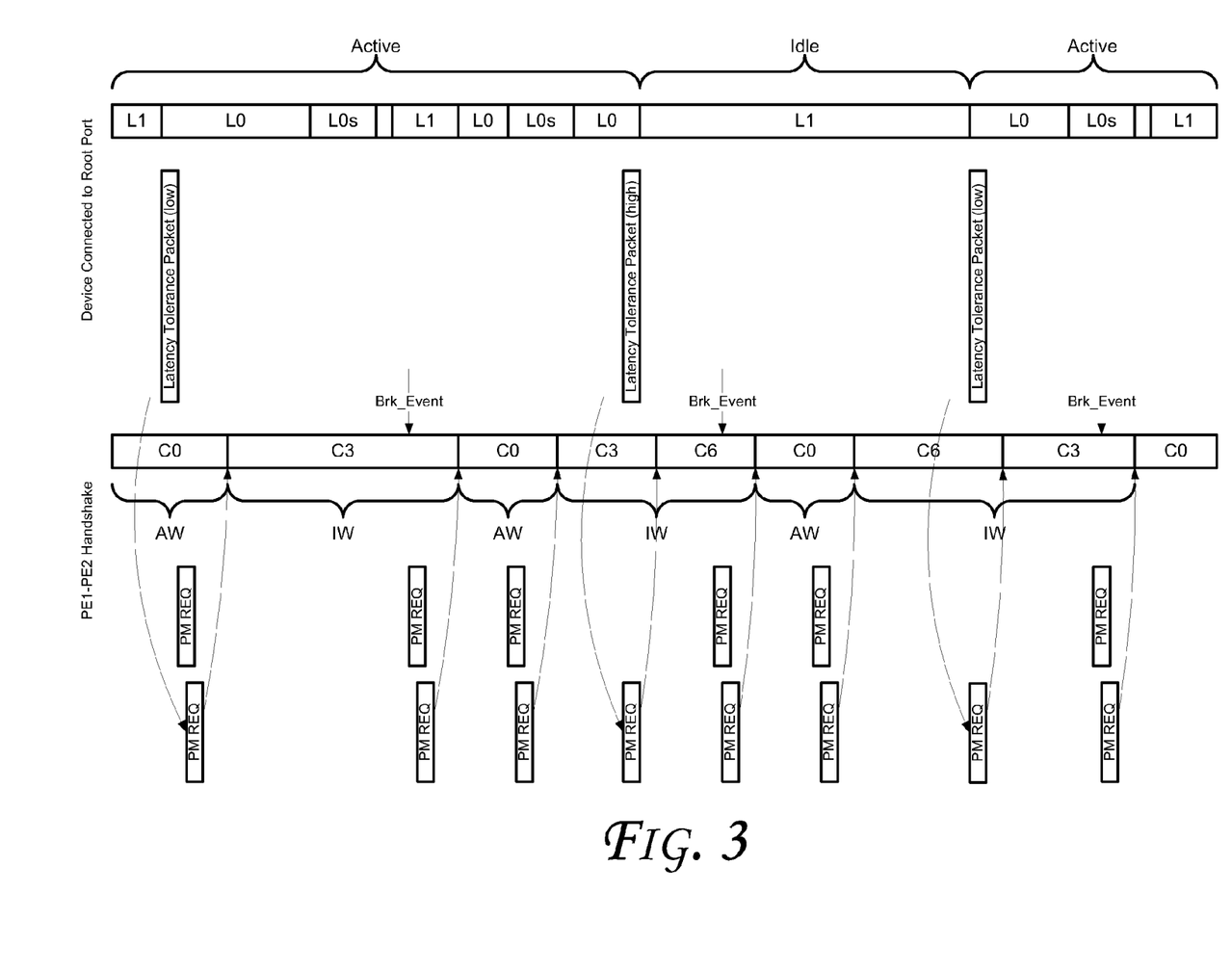
FIG. 3 is a schematic timing diagram of an example of latency reporting and policy engine coordination, according to some embodiments.

FIG. 3 is a schematic timing diagram of an example of latency reporting and policy engine coordination, according to some embodiments. FIG. 3 illustrates the utilization of latency reporting while two policy engines (PE1 and PE2) share latency information and coordinate to steer the appropriate C-states for microprocessors, memory controller power management and any other platform PLL power management. A device exhibiting a bursty traffic pattern with intermediate low power states when active and thus reporting a low latency tolerance. The microprocessor may resist entering deeper sleep states that would impact performance such as flushing its caches. However, when the device is idle and reports an extended latency tolerance, that information becomes helpful to enhance utilization of deeper sleep states for the platform and microprocessor while armed with the knowledge that any visible degradation impact is unlikely.

Figure 4:
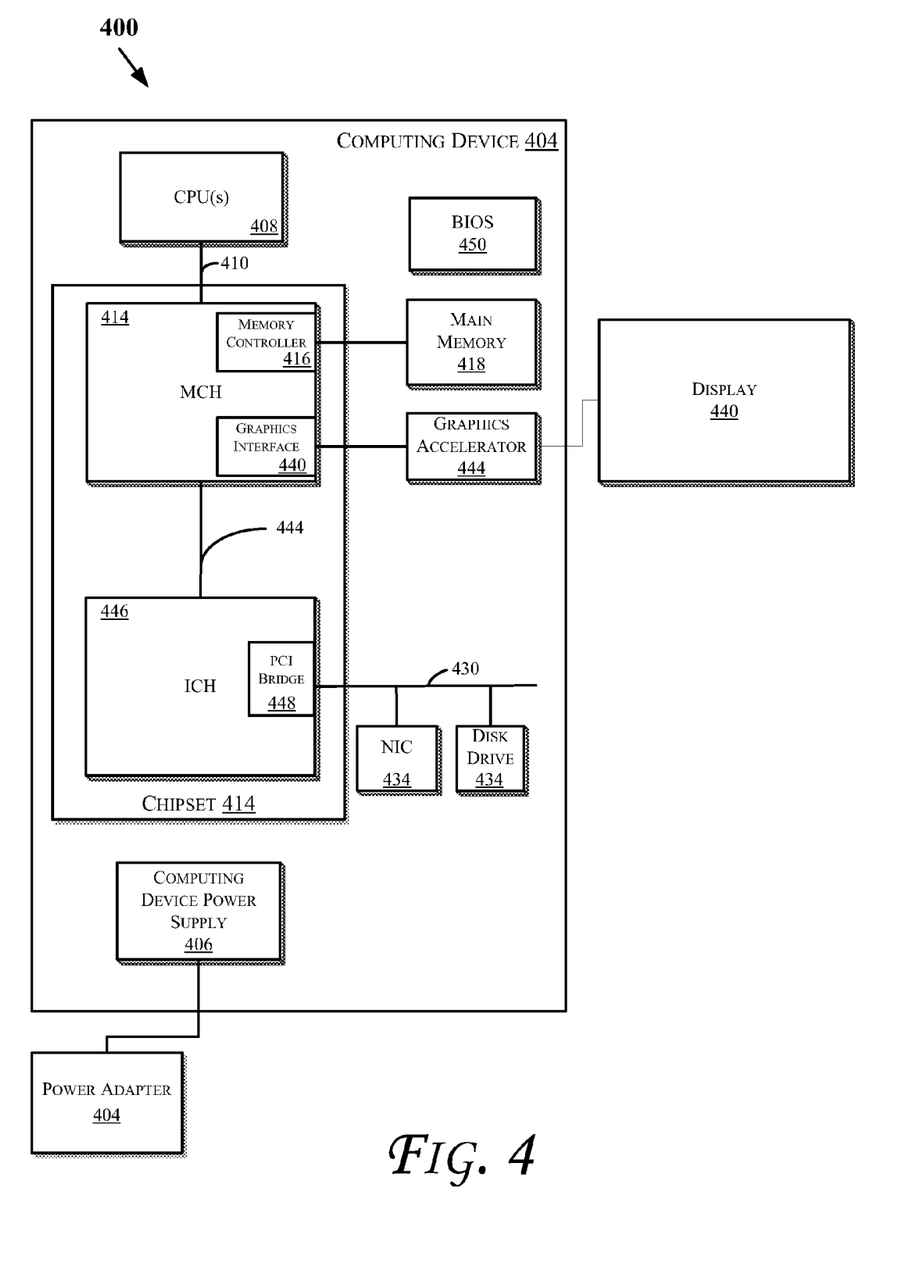
FIG. 4 is a schematic illustration of a computer system, in accordance with some embodiments.

FIG. 4 is a schematic illustration of an architecture of a computer system which may implement latency based platform coordination n accordance with some embodiments. Computer system 400 includes a computing device 402 and a power adapter 404 (e.g., to supply electrical power to the computing device 402). The computing device 402 may be any suitable computing device such as a laptop (or notebook) computer, a personal digital assistant, a desktop computing device (e.g., a workstation or a desktop computer), a rack-mounted computing device, and the like.

Electrical power may be provided to various components of the computing device 402 (e.g., through a computing device power supply 406) from one or more of the following sources: one or more battery packs, an alternating current (AC) outlet (e.g., through a transformer and/or adaptor such as a power adapter 404), automotive power supplies, airplane power supplies, and the like. In one embodiment, the power adapter 404 may transform the power supply source output (e.g., the AC outlet voltage of about 110VAC to 240VAC) to a direct current (DC) voltage ranging between about 7VDC to 12.6VDC. Accordingly, the power adapter 404 may be an AC/DC adapter.

The computing device 402 may also include one or more central processing unit(s) (CPUs) 408 coupled to a bus 410. In one embodiment, the CPU 408 may be one or more processors in the Pentium® family of processors including the Pentium® II processor family, Pentium® III processors, Pentium® IV processors, Core and Core2 processors available from Intel® Corporation of Santa Clara, Calif. Alternatively, other CPUs may be used, such as Intel's Itanium®, XEON™, and Celeron® processors. Also, one or more processors from other manufactures may be utilized. Moreover, the processors may have a single or multi core design.

A chipset 412 may be coupled to the bus 410. The chipset 412 may include a memory control hub (MCH) 414. The MCH 414 may include a memory controller 416 that is coupled to a main system memory 418. The main system memory 418 stores data and sequences of instructions that are executed by the CPU 408, or any other device included in the system 400. In some embodiments, the main system memory 418 includes random access memory (RAM); however, the main system memory 418 may be implemented using other memory types such as dynamic RAM (DRAM), synchronous DRAM (SDRAM), and the like. Additional devices may also be coupled to the bus 410, such as multiple CPUs and/or multiple system memories.

In some embodiments, main memory 418 may include a one or more flash memory devices. For example, main memory 418 may include either NAND or NOR flash memory devices, which may provide hundreds of megabytes, or even many gigabytes of storage capacity.

The MCH 414 may also include a graphics interface 420 coupled to a graphics accelerator 422. In one embodiment, the graphics interface 420 is coupled to the graphics accelerator 422 via an accelerated graphics port (AGP). In an embodiment, a display (such as a flat panel display) 440 may be coupled to the graphics interface 420 through, for example, a signal converter that translates a digital representation of an image stored in a storage device such as video memory or system memory into display signals that are interpreted and displayed by the display. The display 440 signals produced by the display device may pass through various control devices before being interpreted by and subsequently displayed on the display.

A hub interface 424 couples the MCH 414 to an input/output control hub (ICH) 426. The ICH 426 provides an interface to input/output (I/O) devices coupled to the computer system 400. The ICH 426 may be coupled to a peripheral component interconnect (PCI) bus. Hence, the ICH 426 includes a PCI bridge 428 that provides an interface to a PCI bus 430. The PCI bridge 428 provides a data path between the CPU 408 and peripheral devices. Additionally, other types of I/O interconnect topologies may be utilized such as the PCI Express™ architecture, available through Intel® Corporation of Santa Clara, Calif.

The PCI bus 430 may be coupled to a network interface card (NIC) 432 and one or more disk drive(s) 434. Other devices may be coupled to the PCI bus 430. In addition, the CPU 408 and the MCH 414 may be combined to form a single chip. Furthermore, the graphics accelerator 422 may be included within the MCH 414 in other embodiments.

Additionally, other peripherals coupled to the ICH 426 may include, in various embodiments, integrated drive electronics (IDE) or small computer system interface (SCSI) hard drive(s), universal serial bus (USB) port(s), a keyboard, a mouse, parallel port(s), serial port(s), floppy disk drive(s), digital output support (e.g., digital video interface (DVI)), and the like.

System 400 may further include a basic input/output system (BIOS) 450 to manage, among other things, the boot-up operations of computing system 400. BIOS 450 may be embodied as logic instructions encoded on a memory module such as, e.g., a flash memory module.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "an embodiment" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An electronic apparatus, comprising:
   a root complex; and
   a bridge to couple one or more components to the root complex wherein the bridge has a characteristic delay, $\Delta$, associated with data traffic flowing through the bridge;
   the root complex to receive from the bridge latency tolerance information from at least one of the one or more components, wherein the latency tolerance information is structured as a tuple having both a snoop latency parameter and a non-snoop latency parameter for each of the one or more components, the bridge to be able to:
   determine a minimum latency parameter data set adjusted for the characteristic delay from the bridge latency tolerance information; and
   provide to the root complex the minimum latency parameter data set.

2. The electronic apparatus of claim 1, wherein the root complex comprises a policy engine to determine a latency tolerance value from the minimum latency parameter data set and to determine a power management policy for the root complex using the latency tolerance value.

3. The electronic apparatus of claim 2, wherein the latency tolerance value is a worst-case tolerance value and the power management policy ensures that the root complex is not idle in excess of the worst-case tolerance value.

4. The electronic apparatus of claim 2, wherein the bridge is able to operate in one of multiple different power states, each of the multiple different power states having a different characteristic delay, and wherein the policy engine adjusts the latency tolerance value to compensate for the characteristic delay of the bridge device.

5. The electronic apparatus of claim 4, wherein the bridge:
   receives latency parameters from at least one of the one or more components,
   deducts the characteristic delay of the power state in which the bridge is operating from the latency parameters to determine adjusted latency parameters; and
   reports the adjusted latency parameters to the policy engine.

6. The electronic apparatus of claim 5, wherein the policy engine further comprises logic to:
   compare the latency tolerance information received from the one or more components; and
   select the lowest latency value from the plurality of latency values.

7. The electronic apparatus of claim 2, wherein the policy engine further comprises logic to monitor the latency tolerance value over time during operation of the electronic device and updates power management policies as a function of changes in the latency tolerance value.

8. The electronic apparatus of claim 2, wherein the policy engine further comprises logic to select a sleep state that enables the system to meets the minimum latency tolerance value.

9. A method to implement latency based platform coordination in an electronic device, comprising:
- receiving, in a root complex, latency tolerance information from a bridge that couples one or more components to the root complex, wherein the bridge has a characteristic delay, $\Delta$, associated with data traffic flowing through the bridge and wherein the latency tolerance information is structured as a tuple having both a snoop latency parameter and a non-snoop latency parameter for each of the one or more components;
- determining a minimum latency parameter data set adjusted for the characteristic delay from the latency tolerance information; and
- determining a power management policy for the root complex using the minimum latency parameter data set.

10. The method of claim 9, wherein the latency tolerance information is a worst-case tolerance value and the power management policy ensures that the root complex is not idle in excess of the worst-case tolerance value.

11. The method of claim 10, wherein the bridge is able to operate in one of multiple different power states, each of the multiple different power states having a different characteristic delay, and wherein the root complex adjusts the latency tolerance information to compensate for the characteristic delay of the bridge device.

12. The method of claim 11, wherein the bridge:
- receives latency parameters from at least one of the one or more components,
- deducts the characteristic delay of the power state in which the bridge is operating from the latency parameters to determine adjusted latency parameters; and
- reports the adjusted latency parameters to the root complex.

13. The method of claim 12, wherein the root complex:
- compares the latency tolerance information received from the one or more components; and
- selects the lowest latency value from the latency tolerance information.

14. The method of claim 9, wherein the root complex monitors latency tolerance information over time during operation of the electronic device and updates power management policies as a function of changes in the latency tolerance information.

15. The method of claim 9, wherein the root complex selects a sleep state that permits the system to meets the minimum latency tolerance value.

* * * * *

UNITED STATES PATENT AND TRADEMARK OFFICE
CERTIFICATE OF CORRECTION

PATENT NO. : 8,332,675 B2
APPLICATION NO. : 13/213353
DATED : December 11, 2012
INVENTOR(S) : Seh W. Kwa et al.

It is certified that error appears in the above-identified patent and that said Letters Patent is hereby corrected as shown below:

On the first page, in field (56), in column 2, under "Other Publications", line 6, delete "PIC-SIG" and insert -- PCI-SIG --, therefor.

On sheet 1 of 4, in Figure 1, line 1, delete " Engine " and insert -- ENGINE --, therefor.

On sheet 4 of 4, in Figure 4, Reference Numeral 444, delete " GRAPHICS " and insert -- GRAPHICS --, therefor.

Signed and Sealed this
Second Day of April, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,332,675 B2  
APPLICATION NO. : 13/213353  
DATED : December 11, 2012  
INVENTOR(S) : Seh W. Kwa et al.

Page 1 of 1

It is certified that error appears in the above-identified patent and that said Letters Patent is hereby corrected as shown below:

On the title page, in item (56), in column 2, under "Other Publications", line 6, delete "PIC-SIG" and insert -- PCI-SIG --, therefor.

In the Drawings:

On sheet 1 of 4, in Figure 1A, line 1, delete "Enginc" and insert -- ENGINE --, therefor.

On sheet 1 of 4, in Figure 1C, line 1, delete "Enginc" and insert -- ENGINE --, therefor.

On sheet 4 of 4, in Figure 4, Reference Numeral 444, delete " GRAPHICS" and insert -- GRAPHICS --, therefor.

This certificate supersedes the Certificate of Correction issued April 2, 2013.

Signed and Sealed this  
Twenty-eighth Day of May, 2013

Teresa Stanek Rea  
*Acting Director of the United States Patent and Trademark Office*